US007865883B1

(12) United States Patent
Sistare et al.

(10) Patent No.: US 7,865,883 B1
(45) Date of Patent: Jan. 4, 2011

(54) PARALLEL AND ASYNCHRONOUS DEBUGGER AND DEBUGGING METHOD FOR MULTI-THREADED PROGRAMS

(75) Inventors: Steven J. Sistare, Westford, MA (US); David Plauger, Littleton, MA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 09/438,205

(22) Filed: Nov. 12, 1999

(51) Int. Cl.
*G06F 9/44* (2006.01)
*G06F 9/46* (2006.01)

(52) U.S. Cl. .............. 717/129; 717/124; 717/125; 717/128; 717/127

(58) Field of Classification Search .............. None
See application file for complete search history.

(56) References Cited

U.S. PATENT DOCUMENTS

| 5,093,914 | A | * | 3/1992 | Coplien et al. | 717/129 |
| 5,687,375 | A | * | 11/1997 | Schwiegelshohn | 717/129 |
| 5,781,778 | A | * | 7/1998 | Meier et al. | 717/127 |
| 5,953,530 | A | | 9/1999 | Rishi et al. | |
| 6,158,045 | A | * | 12/2000 | You | 717/124 |
| 6,378,125 | B1 | * | 4/2002 | Bates et al. | 717/129 |

\* cited by examiner

*Primary Examiner*—Lewis A Bullock, Jr.
*Assistant Examiner*—Chris Nelson
(74) *Attorney, Agent, or Firm*—Meyertons, Hood, Kivlin, Kowert & Goetzel, P.C.

(57) ABSTRACT

A debugger for aiding in the debugging of multi-threaded program, in response to an event such as, for example, a breakpoint in a thread which has caused an operating system to stop execution of all threads, identifies the thread which contained the breakpoint. After identifying the thread which contained the breakpoint, the debugger enables the operating system to resume execution of the other threads, that is, the threads which did not contain the breakpoint. By allowing the other threads, that is, the threads which did not contain the breakpoint, to continue execution, the debugger's impact on program execution is substantially reduced, particularly for programs which contain a large number of threads.

20 Claims, 5 Drawing Sheets

PARALLEL AND ASYNCHRONOUS DEBUGGER AND DEBUGGING METHOD FOR MULTI-THREADED PROGRAMS

FIELD OF THE INVENTION

The invention relates generally to the field of digital computer systems and more particularly to debuggers for assisting in the debugging of programs. The invention specifically provides a debugger for assisting in the efficient debugging of multi-threaded programs

BACKGROUND OF THE INVENTION

Computers typically execute programs in one or more processes or threads on one or more processors. In developing computer programs, programmers often use "debugging" tools to enable them to verify correct operation of the programs. Using debugging tools, programmers can step through a program and determine whether the results that the program generates at various points are as would be expected. If the results are correct at one point, and not at a subsequent point, the programmer can expect that the portion of a program between the two points is in error. Typically to facilitate debugging, a programmer will insert "breakpoint" instructions at locations in the code he or she wishes a program to stop, to allow him or her to determine whether the program is operating as expected. In debugging code for a single thread in a single process, it is relatively straight-forward to follow operations performed by the processor during debugging.

However, difficulties arise when a program is multi-threaded. Current debuggers for multi-threaded programs are synchronous, that is, they are configured to stop all threads of a program when a breakpoint instruction is encountered in any of the threads. After the threads are stopped, the programmer can issue commands to the debugger to enable it to step through the thread in which the breakpoint instruction was encountered. This has a number of drawbacks. First, commands provided by an programmer to a debugger, after a breakpoint is encountered, to enable the thread in which the breakpoint instruction was provided may never be completed because that thread may block waiting for a resource that is currently allocated to and owned by another thread. In addition, a program may make use of library threads for, for example, communication among processes, which may not be known to the programmer. If a library thread is stalled, the program being debugged may experience communication errors. Furthermore, such debuggers typically do not scale well as the number of threads increases.

SUMMARY OF THE INVENTION

The invention provides a new and improved debugger system and method for aiding in the efficient debugging of multi-threaded programs in a digital computer system.

In brief summary, the new debugger, in response to events such as, for example, a breakpoint in a thread which has caused an operating system to stop execution of all threads, identifies the thread which contained the breakpoint. After identifying the thread which contained the breakpoint, the debugger enables the operating system to resume execution of the other threads, that is, the threads which did not contain the breakpoint.

By allowing the other threads, that is, the threads which did not contain the breakpoint, to continue execution, the debugger's impact on program execution is substantially reduced, particularly for programs which contain a large number of threads.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
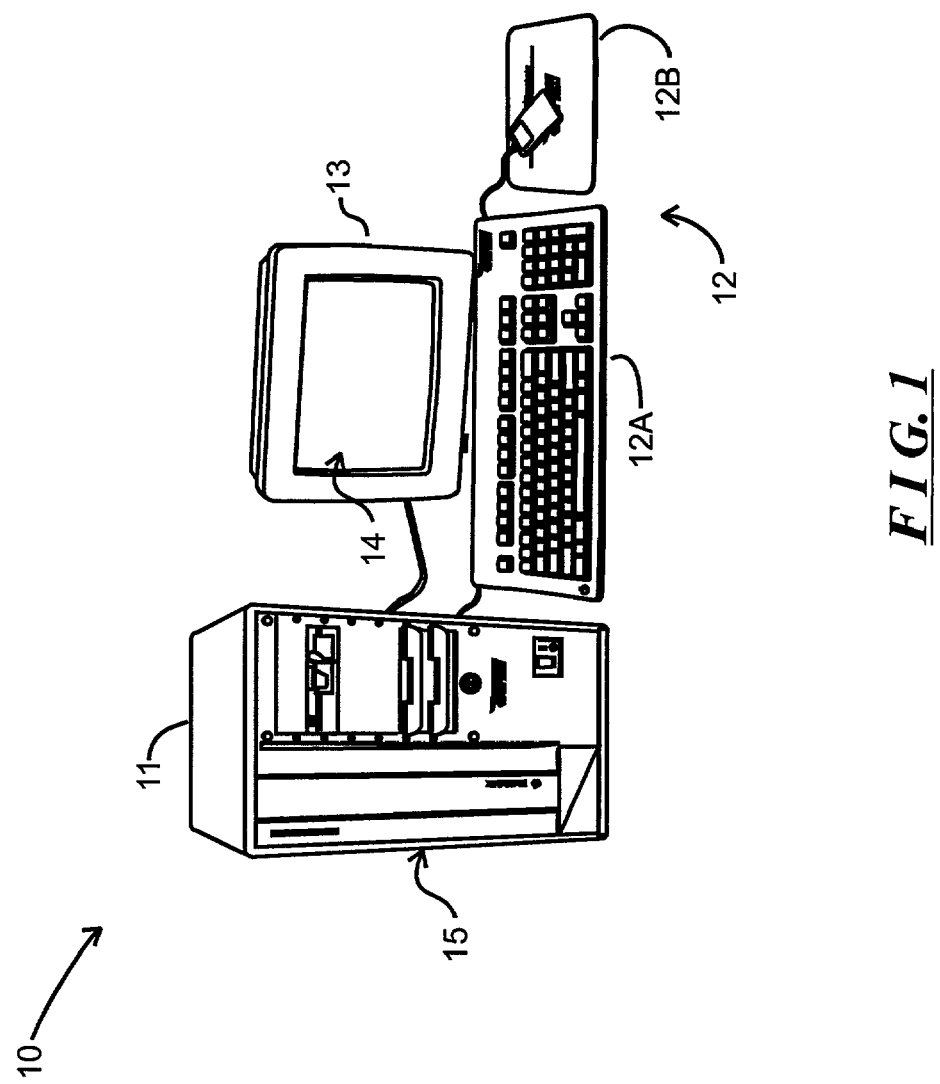
FIG. 1 is a functional block diagram of a digital computer having a parallel asynchronous debugger for facilitating the debugging of a multi-threaded program.

FIG. 1 attached hereto depicts an illustrative digital computer 10 including a parallel asynchronous debugger for facilitating the debugging of a multi-threaded program, constructed in accordance with the invention. With reference to FIG. 1, the computer system 10 in one embodiment includes a processor module 11 and operator interface elements comprising operator input components such as a keyboard 12A and/or a mouse 12B (generally identified as operator input element(s) 12) and operator output components such as a video display device 13 with integral speakers 15. The illustrative computer system 10 is of the conventional stored-program computer architecture.

The processor module 11 includes, for example, processor, memory and mass storage devices such as disk and/or tape storage elements (not separately shown) which perform processing and storage operations in connection with digital data provided thereto. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the processor, information stored in the mass storage subsystems may be transferred to the memory for storage. After the information is stored in the memory, the processor may retrieve it from the memory for processing. After the processed data is generated, the processor may also enable the mass storage subsystems to retrieve the processed data from the memory for relatively long-term storage.

The operator input element(s) 12 are provided to permit an operator to input information for processing and/or control of the digital computer system 10. The video display device 13 and speakers 15 are provided to, respectively, display visual output information on a screen 14, and audio output information, which are generated by the processor module 11, which may include data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 may include one or more network or communication ports, generally identified by reference numeral 15, which can be connected to communication links to connect the computer system 10 in a computer network, or to other computer systems (not shown) over, for example, the public telephony system. The ports enable the computer system 10 to transmit information to, and receive information from, other computer systems and other devices in the network.

Figure 2:
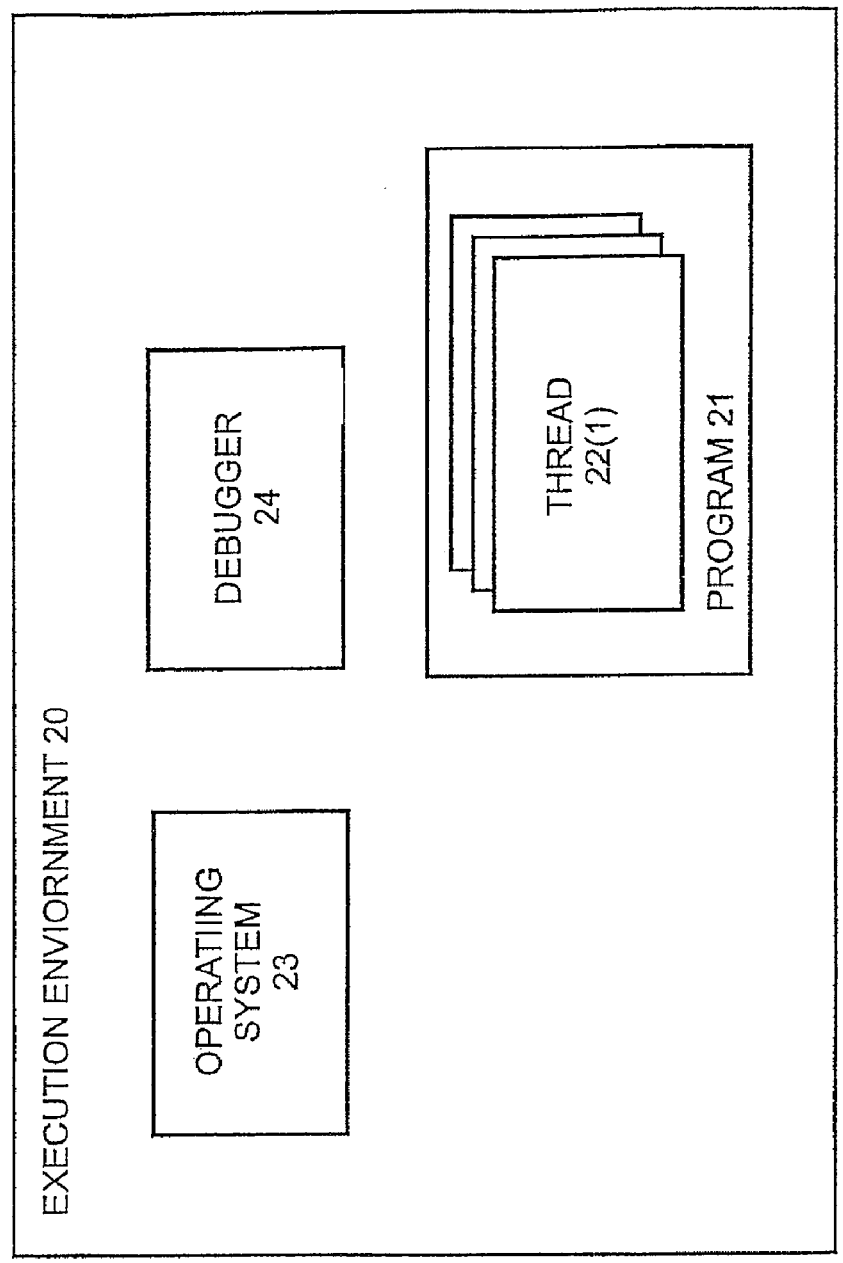
FIG. 2 is a functional block diagram useful in understanding the operations performed by the parallel asynchronous debugger.

The invention provides a parallel asynchronous debugger for facilitating the debugging of a multi-threaded program. The operations of the debugger will be described in connection with FIG. 2 and a flow control in FIG. 3. With reference initially to FIG. 2, that FIG. depicts an execution environment 20 for a program 21, the program comprising a plurality of threads 22(1) through 22(T) (generally identified by reference numeral 22(t)). The program 21 depicted in FIG. 2 may comprise a single process, in which all of the threads 22(t) are executed in a single address space, or in multiple processes, in which at least some of the threads are executed in different address spaces. In addition, the threads may be executed by a single processor, or some or all of them may be executed by separate processors. The threads 22(t) are executed under control of an operating system 23, and, during a debugging session, both the operating system 23 and execution of the threads will be controlled by the debugger 24. Any conventional operating system can be used in the execution environment 20, including Unix or a Unix-like operating system.

The debugger 24 performs a number of operations in connection with the invention. Generally during normal processing operations, that is, when a program is being executed other than during a debugging session, the operating system 23 will, in response to requests from the program 21, control creation of a thread and deletion of a thread. However, during a debugging session, requests from the program to create and delete threads are processed by the debugger 24. Thus, the debugger 24 will be aware of the existence of each of the threads.

In addition, if a thread $22(t_B)$ encounters a breakpoint instruction during its execution, and if execution of the other threads $22(t_1), 22(t_2), \ldots (t_1, t_2 \neq t_B)$ is stopped by, for example, the operating system 23, the debugger 24 identifies the thread $22(t_B)$ which contained the breakpoint instruction, and enables the other threads $22(t_1), 22(t_2), \ldots$ to resume execution. Thereafter, the debugger 24 enables the operator to step through the thread $22(t_B)$ which contained the breakpoint instruction on, for example, an instruction-by-instruction basis, or otherwise control its subsequent execution. The debugger 24 can receive commands from the operator through an operator input device 12, such as the keyboard 12A, mouse 12B, or the like, and can also enable the display of information generated by the thread $22(t_B)$ and/or one or more of the other threads $22(t_1), 22(t_2)$, and the like on the screen 14 of the video display device 13.

Figure 3:
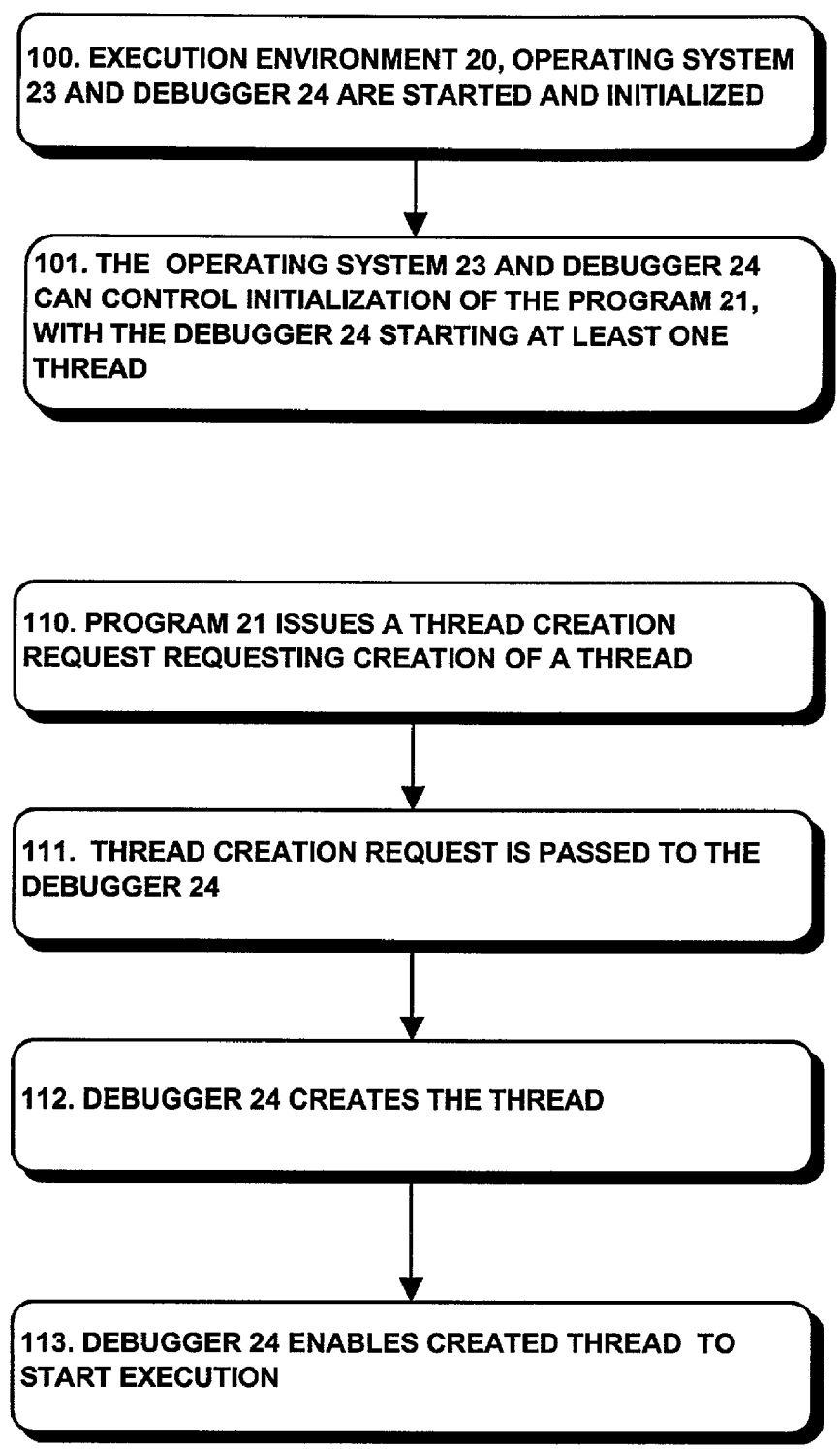
FIG. 3 is a flow chart describing operations performed by the parallel asynchronous debugger in connection with the invention.
Figure 3A:
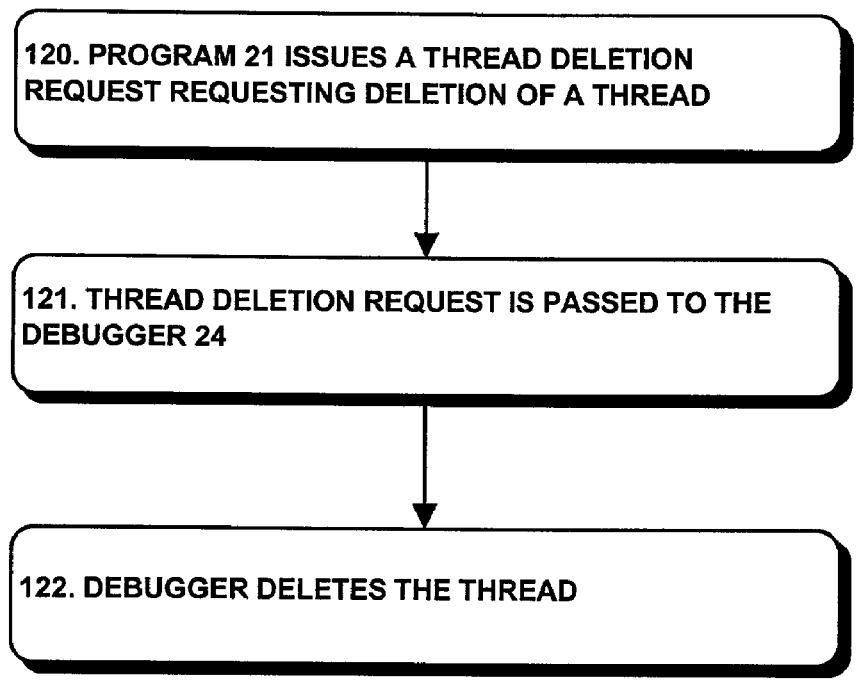
FIG. 3A is a flow chart of operations performed in handling a thread deletion request in accordance with an embodiment of the present invention.

With this background, operations performed by the debugger will be described in connection with the flow chart depicted in FIG. 3. Generally, the execution environment 20, operating system 23 and debugger 24 are started and initialized in a conventional manner (step 100). Thereafter, the operating system 23 and debugger 24 can control initialization of the program 21, with the debugger starting at least one thread $22(t)$ (step 101). If the program 21 issues a thread creation request requesting creation of a thread (step 110), the thread creation request is passed to the debugger 24 (step 111), which can create the thread (step 112) and enable it to start execution (step 113). Turning now to FIG. 3A, a flowchart of operations performed in handling a thread deletion request in accordance with an embodiment of the present invention is presented. If the program 21 issues a thread deletion request requesting deletion of a thread (step 120), the thread deletion request is passed to the debugger 24 (step 121), which can delete the thread (step 122).

Figure 3B:
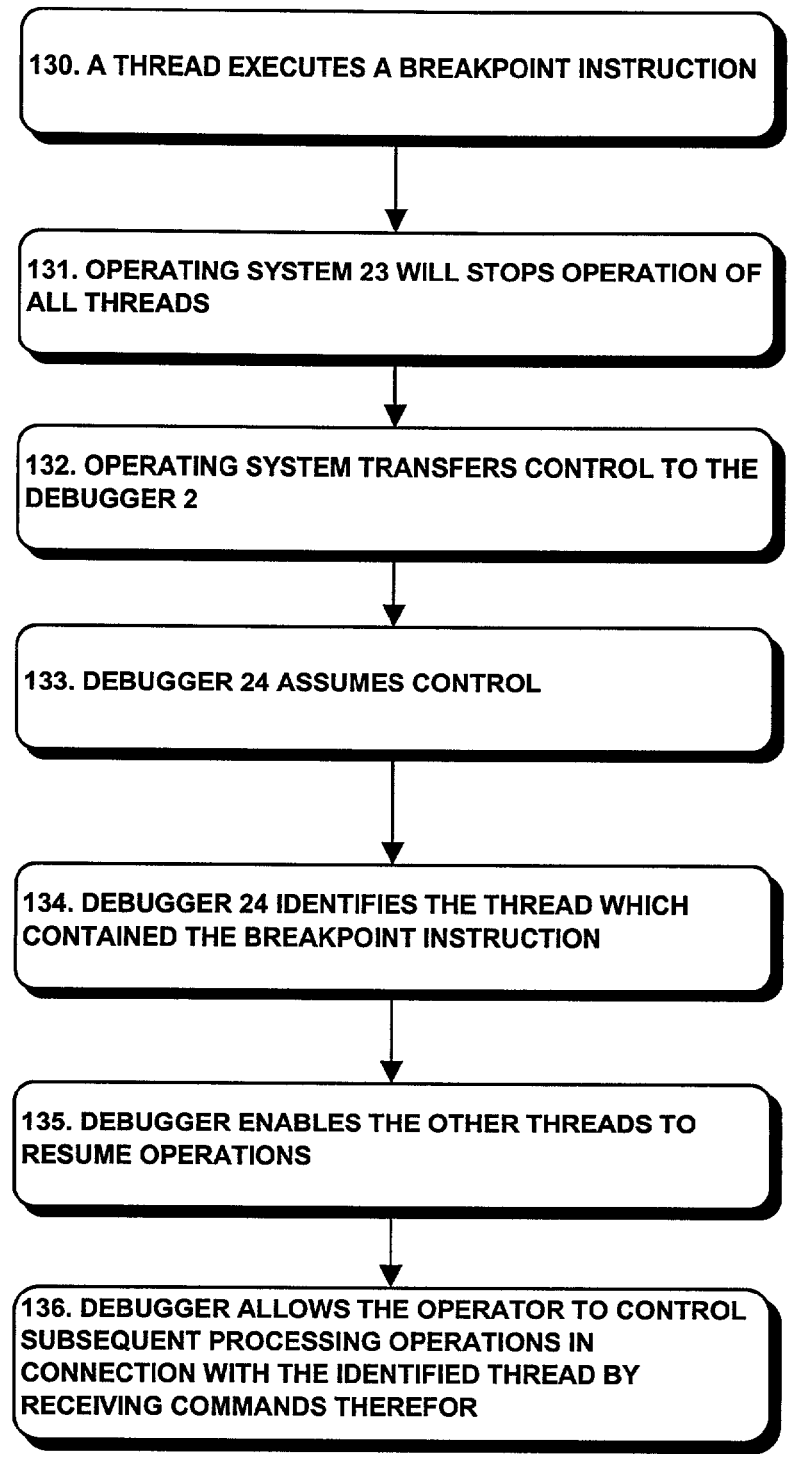
FIG. 3B is a flow chart of operations performed in handling a break point instruction in accordance with an embodiment of the present invention.

Referring now to FIG. 3B, a flowchart of operations performed in handling a break point instruction in accordance with an embodiment of the present invention is presented. If a thread $22(t_B)$ executes a breakpoint instruction (step 130), which may result in a trap to the operating system 23, the operating system 23 will typically stop operation of all of the threads $22(t)$ (step 131) and transfer control to the debugger 24 (step 132). In that case, the debugger 24 assumes control (step 133) and identifies the thread $22(t_B)$, which contained the breakpoint instruction (step 134). After the debugger has identified the thread $22(t_B)$, it enables the other threads $22(t_1)$, $22(t_2), \ldots (t_1, t_x, \ldots \neq t_B)$ to resume operations (step 135), and allows the operator to control subsequent processing operations in connection with the identified thread $22(t_B)$ by receiving commands therefor (step 136).

In those operations, the debugger 24 can receive commands from the operator through an operator input device 12, such as the keyboard 12A, mouse 12B, or the like, and can also enable the display of information generated by the thread $22(t_B)$ and/or one or more of the other threads $22(t_1), 22(t_2)$, and the like on the screen 14 of the video display device 13. For example, the operator can iteratively issue commands to enable subsequent instructions in the identified thread to be executed, for example, one-by-one, in which case the debugger 24 will step through those instruction. At some point, the operator may issue a command to enable the thread's subsequent instructions to be executed in a normal manner, in which case the debugger 24 can allow the thread $22(t_B)$ to resume operations, until a breakpoint instruction is again encountered, at which point the operations described above in connection with steps 130-136 can be performed.

The debugger 24 can perform the operations described above when the program issues a thread creation or deletion request (reference steps 110 and 120), or a thread $22(t_B)$ executes a breakpoint instruction (reference step 130). Thus, the operations described above in connection with FIG. 3 may overlap. Thus, for example, the debugger can be controlling operations in connection with several threads following breakpoint instructions in each respective thread, contemporaneously.

A debugger 24 in accordance with the invention provides a number of advantages. In particular it allows the debugger, during a debugging session, to control operations in connection with a single thread in response to a breakpoint instruction contained in the thread, while allowing other threads to continue operation in a conventional manner. This minimizes the likelihood that deadlock conditions will arise, which can occur if execution of all threads is paused. It also reduces the likelihood of errors which can arise in connection with stalled library threads. Further, the debugger will scale more appropriately, since only the debugger 24 will control operations in connection with the thread which contains the breakpoint instruction.

It will be appreciated that a number of modifications may be made to the debugger described herein. For example, although the debugger 24 has been described in connection with a breakpoint instruction, it will be appreciated that the debugger 24 can perform corresponding operations in connection with other debugging instructions, such as instructions which give rise to watchpoint traps and the like.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A computer-readable storage medium, the computer readable storage medium having stored thereon instructions executable to cause one or more processors to:
   execute, on a first processor, two or more threads associated with a program,
   in response to a breakpoint event in connection with a breakpoint in a first thread which has caused an operating system to stop execution of the two or more threads associated with the program,
      identify, by a debugger, the first thread as containing the breakpoint,
      transfer control of the two or more threads associated with the program from the operating system to the debugger,
      enable others of the two or more threads to resume executing by passing control of the others of the two or more threads back to the operating system, wherein the others of the two or more threads do not contain the breakpoint instruction, and
      simultaneously execute the first thread under control of the debugger, wherein the debugger controls subsequent processing operations in connection with the first thread by receiving commands from a user, and
      wherein the commands direct the debugger to step through the first thread.

2. The computer-readable storage medium of claim 1, further comprising instructions executable to cause the one or more processors to:
   initialize an execution environment, the operating system, and the debugger.

3. The computer-readable storage medium of claim 2, further comprising instructions executable to cause the one or more processors to:
   initialize the program; and
   in response to a first request from the program, create, under control of the debugger, a second thread among the one or more threads.

4. The computer-readable storage medium of claim 3, further comprising instructions executable to cause the one or more processors to:
   in response to a second request from the program, delete, under the control of the debugger, the second thread.

5. The computer-readable storage medium of claim 3, wherein the first thread is executed in a first address space and the second thread is executed in a second address space.

6. The computer-readable storage medium of claim 3, wherein the first thread is executed by the first processor and the second thread is executed by a second processor among the one or more processors.

7. The computer-readable storage medium of claim 6, further comprising instructions executable to cause the one or more processors to:
   display information generated by the first thread and the second thread.

8. A method, comprising:
   executing, on a first processor, two or more threads associated with a program;
   responsive to the first processor executing a breakpoint instruction, stopping execution of the two or more threads associated with the program;
   transferring control of the two or more threads associated with the program from an operating system to a debugger;
   identifying as containing the breakpoint instruction, by the debugger, a first thread from among the two or more threads associated with the program;
   resuming execution of other threads from among the two or more threads associated with the program by passing control of the other threads back to the operating system, wherein the other threads do not contain the breakpoint instruction; and
   simultaneously executing the first thread under control of the debugger, wherein the debugger controls subsequent processing operations in connection with the first thread by receiving commands from a user, and
   wherein the commands direct the debugger to step through the first thread.

9. The method of claim 8, further comprising:
   initializing an execution environment, the operating system, and the debugger.

10. The method of claim 9, further comprising:
    initializing the program; and
    in response to a first request from the program, the debugger creating a second thread under control of the debugger among the two or more threads.

11. The method of claim 10, further comprising:
    in response to a second request from the program, the debugger deleting the second thread.

12. The method of claim 11, wherein the first thread is executed in a first address space and the second thread is executed in a second address space.

13. The method of claim 11, wherein the first thread is executed by the first processor and the second thread is executed by a second processor.

14. The method of claim 13, further comprising displaying information generated by the first thread and the second thread.

15. A system, the system comprising:
one or more processors;
a memory storing program instructions, wherein the program instructions are executable to cause the one or more processors to execute a method comprising:
  executing, on a first processor among the one or more processors, two or more threads associated with a program;
  responsive to the first processor executing a breakpoint instruction, stopping execution of the two or more threads associated with the program;
  transferring control of the two or more threads associated with the program from an operating system to a debugger;
  identifying as containing the breakpoint instruction, by the debugger, a first thread from among the two or more threads associated with the program;
  resuming execution of other threads from among the two or more threads associated with the program by passing control of the other threads back to the operating system, wherein the other threads do not contain the breakpoint instruction; and
  simultaneously executing the first thread under control of the debugger, wherein the debugger controls subsequent processing operations in connection with the first thread by receiving commands from a user, and wherein the commands direct the debugger to step through the first thread.

16. The system of claim 15, wherein the method further comprises initializing an execution environment, the operating system, and the debugger.

17. The system of claim 16, wherein the method further comprises initializing the program; and
  in response to a first request from the program, the debugger creating a second thread under control of the debugger among the two or more threads.

18. The system of claim 17, wherein the method further comprises
  in response to a second request from the program, the debugger deleting the second thread.

19. The system of claim 18, wherein the first thread is executed in a first address space and the second thread is executed in a second address space.

20. The system of claim 18, wherein the first thread is executed by the first processor and the second thread is executed by a second processor.

* * * * *